US009164673B2

(12) United States Patent
Cheng et al.

(10) Patent No.: US 9,164,673 B2
(45) Date of Patent: Oct. 20, 2015

(54) LOCATION-DEPENDENT DRAG AND DROP UI

(75) Inventors: Karen X. Cheng, San Francisco, CA (US); Benjamin Edward Rampson, Woodinville, WA (US); Eric W. Patterson, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 292 days.

(21) Appl. No.: 13/550,409

(22) Filed: Jul. 16, 2012

(65) Prior Publication Data

US 2014/0019899 A1    Jan. 16, 2014

(51) Int. Cl.
G06F 3/048 (2013.01)
G06F 3/0486 (2013.01)

(52) U.S. Cl.
CPC .................. G06F 3/0486 (2013.01)

(58) Field of Classification Search
CPC ...................................... G06F 3/048
USPC ........................................ 715/770
See application file for complete search history.

(56) References Cited

U.S. PATENT DOCUMENTS

| | | | | |
|---|---|---|---|---|
| 7,478,336 | B2* | 1/2009 | Chen et al. | 715/770 |
| 7,503,012 | B2* | 3/2009 | Chen et al. | 715/769 |
| 7,565,618 | B2* | 7/2009 | Sheasby et al. | 715/769 |
| 7,788,593 | B1* | 8/2010 | Grechishkin et al. | 715/778 |
| 7,877,701 | B2* | 1/2011 | Cohen et al. | 715/770 |
| 8,261,213 | B2* | 9/2012 | Hinckley et al. | 715/863 |
| 8,549,435 | B1* | 10/2013 | Bushore et al. | 715/838 |
| 8,615,511 | B2* | 12/2013 | Jones | 707/722 |
| 8,621,375 | B2* | 12/2013 | Berger et al. | 715/770 |
| 2004/0001094 | A1* | 1/2004 | Unnewehr et al. | 345/769 |
| 2006/0225094 | A1 | 10/2006 | Facemire et al. | |
| 2007/0061369 | A1* | 3/2007 | Folting et al. | 707/200 |
| 2010/0083086 | A1* | 4/2010 | Berger et al. | 715/213 |
| 2010/0174975 | A1* | 7/2010 | Mansfield et al. | 715/227 |
| 2010/0211895 | A1* | 8/2010 | Mistry et al. | 715/764 |
| 2011/0271218 | A1* | 11/2011 | Berger et al. | 715/770 |
| 2011/0276867 | A1* | 11/2011 | Machalek | 715/212 |
| 2012/0159297 | A1* | 6/2012 | Peters | 715/212 |
| 2013/0097177 | A1* | 4/2013 | Fan et al. | 707/748 |

(Continued)

OTHER PUBLICATIONS

Google™ Docs 4 Everyone by Steven Holzner, Que Feb. 9, 2009.*

(Continued)

*Primary Examiner* — William Bashore
*Assistant Examiner* — Nathan Shrewsbury
(74) *Attorney, Agent, or Firm* — Damon Rieth; Danielle Johnston-Holmes; Micky Minhas

(57) ABSTRACT

An improved interactive user interface for presenting functionalities of an application is provided. An application functionality applied to a data element range may be represented by a selectable preview element that provides a preview of the application functionality applied to the data element range. Upon selection of a preview element, one or more drop zones may be displayed. The preview element may be dragged to a drop zone and may animate into a visualization of the application functionality applied to the data element. The type of visualization that is displayed may be dependent on the drop zone to which the preview element is dragged. After a preview element is dropped into a drop zone, the functionality may be applied to the data element range and be displayed. The interactive data visualizations may encourage a user to explore features of an application.

21 Claims, 12 Drawing Sheets

(56) References Cited

U.S. PATENT DOCUMENTS

| | | | |
|---|---|---|---|
| 2013/0145244 A1* | 6/2013 | Rothschiller et al. | 715/212 |
| 2013/0159926 A1* | 6/2013 | Vainer et al. | 715/804 |
| 2013/0185619 A1* | 7/2013 | Ludwig | 715/212 |
| 2013/0298060 A1* | 11/2013 | Hoyer | 715/769 |
| 2013/0332862 A1* | 12/2013 | Mirra et al. | 715/760 |
| 2013/0339889 A1* | 12/2013 | Bastide et al. | 715/770 |
| 2014/0040794 A1* | 2/2014 | Jones | 715/763 |
| 2014/0043340 A1* | 2/2014 | Sobhy et al. | 345/473 |
| 2014/0046923 A1* | 2/2014 | Ruble et al. | 707/706 |

OTHER PUBLICATIONS

Android Tablets Made Simple by Marziah Karch, Apress Nov. 18, 2011.*

7 Great Google Spreadsheet Gadgets by Hellen Bradley, PCWorld Jun. 14, 2012.*

Excel® 2010 Bible by: John Walkenbach Publisher: John Wiley & Sons Pub. Date: Jun. 28, 2010.*

"International Search Report & Written Opinion for PCT Patent Application No. PCT/US2013/050569", Mailed Date: Nov. 27, 2013, Filed Date: Jul. 15, 2013, 10 pages.

* cited by examiner

MOBILE COMPUTING DEVICE

LOCATION-DEPENDENT DRAG AND DROP UI

BACKGROUND

Applications such as word processing applications, spreadsheet applications, presentation applications, etc., typically include various functionalities associated with creating and/or manipulating data. As more and more features and functionalities are provided, it can be more difficult for users to discover new features and functionalities. Additionally, some users may see new functionalities but may not find it fun to explore the new features. As a result, users may continue to user the same features they are familiar with using and not find or try out new or other features in an application.

Current solutions may provide a featured tip to help users discover new features; however, this may have a structured feel to a user and may not present a hands-on experience. It is with respect to these and other considerations that the present invention has been made.

SUMMARY

Embodiments of the present invention solve the above and other problems by providing an interactive user interface for presenting functionalities.

According to embodiments, one or more selectable preview elements may be presented, the preview elements providing a preview of an application feature applied to a data element range (e.g., cells of data in a spreadsheet). One or more drop zones may be displayed in a document, the drop zones indicating areas in the document where a preview element may be placed. When a preview element is dragged into a drop zone, a visualization of the application functionality associated with the selected preview element applied to the data element range is displayed. According to embodiments, a preview element may animate into a visualization. The type of visualization that is displayed may be dependent on the drop zone to which the preview element is dragged. The preview element may be dragged from drop zone to drop zone, providing a transition of previews of application functionalities applied to a data element range. After a preview element is dropped into a drop zone, the functionality may be applied to the data element range and be displayed in the document. The interactive data visualizations provided by embodiments may encourage a user to explore features of an application.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
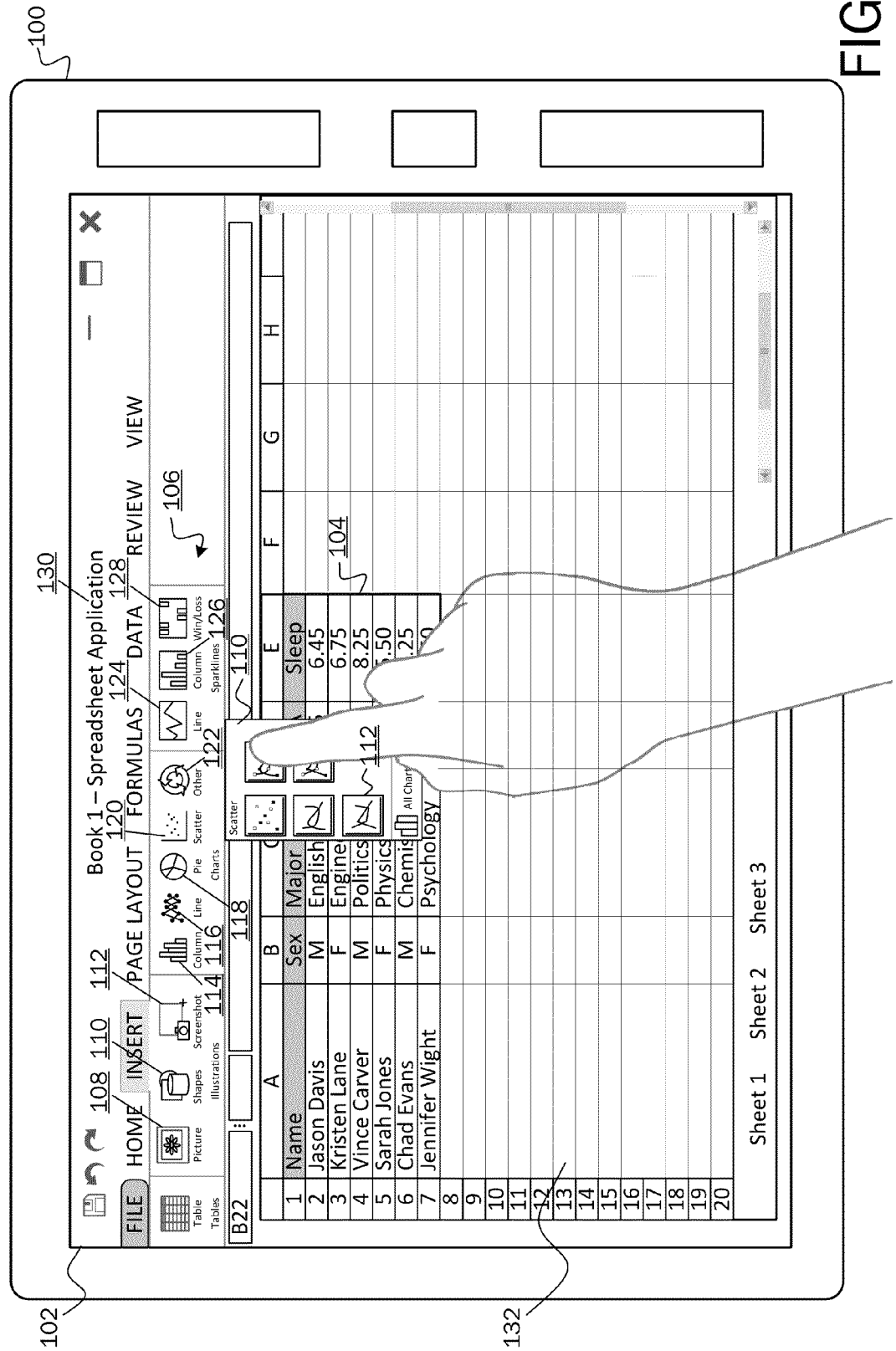
FIG. 1 is an example of a screenshot showing a current implementation of presenting control elements in an application.

As briefly described above, embodiments of the present invention are directed to providing an interactive user interface for presenting functionalities.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. As previously described above, currently, functionalities within an application may not be discovered or utilized.

Embodiments of the present invention comprise a method, system, and computer readable medium for providing an improved interactive user interface for presenting functionalities of an application. According to embodiments, an application functionality applied to a data element or range of data elements in a document may be represented by a selectable preview element. The selectable preview element may provide a preview of the application functionality applied to the data element. Upon selection of a preview element, one or more drop zones may be displayed in the document. If the preview element is dragged to a drop zone, the preview element may animate into a visualization of the application functionality applied to the data element. For example, if the preview element represents a chart functionality, when it is dragged into a drop zone in the document, the chart preview element may morph into a visualization of a chart displayed in the document. The type of visualization that is displayed may be dependent on the drop zone to which the preview element is dragged. The preview element may be dragged from drop zone to drop zone, providing a transition of previews of application functionalities applied to a data element range. After a preview element is dropped into a drop zone, the functionality may be applied to the data element range and be displayed in the document. The interactive data visualizations provided by embodiments may encourage a user to explore features of an application.

FIG. 1 is an example of a screenshot showing a current implementation of presenting control elements in an application 130. As illustrated in the example, an application pane 102 is displayed on a tablet computing device 100. A toolbar or tab bar 106 may be provided in the application pane 102 for presenting various control elements 108-128 that may be grouped by functionality. For example and as illustrated, the application 130 may be a spreadsheet application. Control elements 108-128 may be grouped according to such functionalities as "home," "insert," "page layout," etc., and may be contextual and appear when a certain type of object is selected. Functionality groupings may include subgroupings. For example and as illustrated, the "insert" functionality may include functionality subgroups such as illustration functionalities, chart functionalities, sparklines functionalities, etc. Currently, to select a control element to utilize in a document, for example, inserting a scatter chart into a spreadsheet 132, a selection of content, a data element or range of data elements 104 may be made followed by a selection of a scatter chart control element 120. Accordingly, a menu 110 of additional options, such as various types of scatter charts 112 may be presented. As can be appreciated and as mentioned above, users may find it frustrating to click through several menus to activate a functionality or may be hesitant to try a functionality about which they may be unsure.

Figure 2:
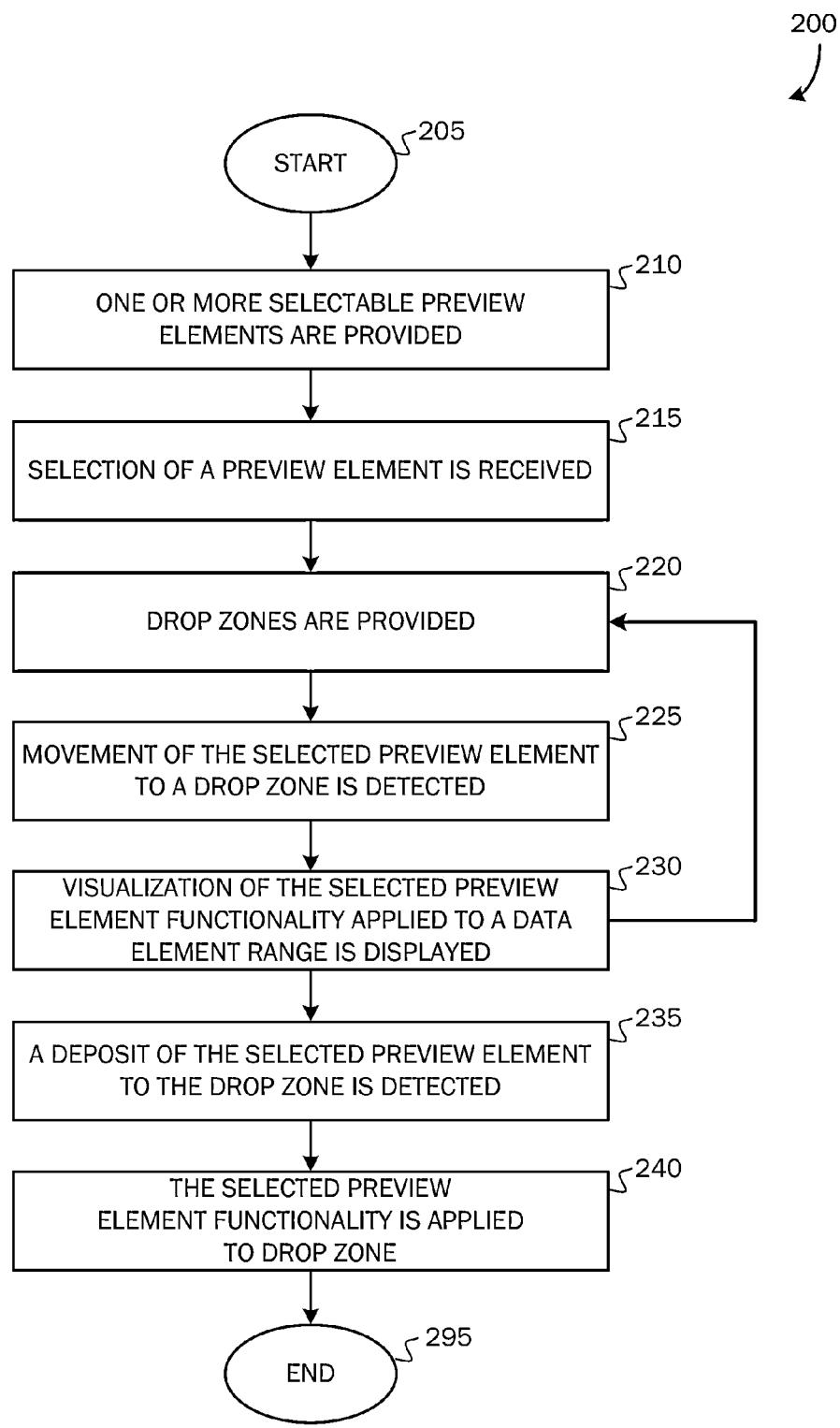
FIG. 2 is a flow chart of a method for providing an interactive user interface for presenting application functionalities according to embodiments.
Figure 3:
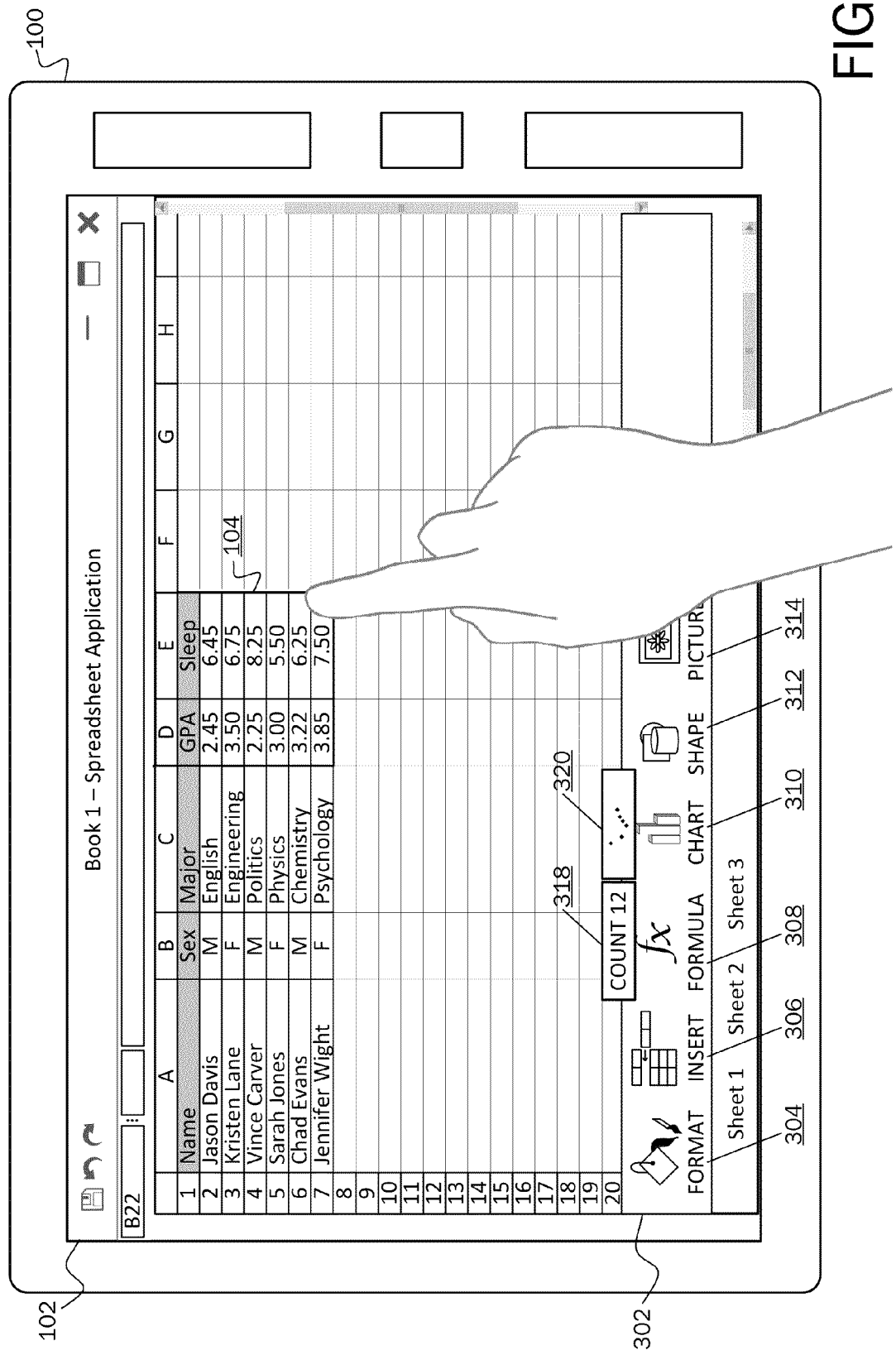
FIG. 3 is an illustration of an example selectable preview element displayed above a chart control element according to embodiments.

FIG. 2 is a flow chart of a method 200 for providing an interactive user interface for presenting application functionalities according to embodiments. For purposes of illustration, the process flow of method 200 will be described with reference to FIGS. 3-8. The method 200 starts at OPERATION 205 and proceeds to OPERATION 210 where one or more selectable preview elements 318,320 may be displayed. According to embodiments, a selectable preview element 318,320 may be displayed as a preview representation of a functionality 304-316 determined to be likely used for a data element or range of data elements (herein referred to as a data element range 104). The selectable preview element 318,320 may be displayed near a respective control element 304-316 representing a likely-to-be-used functionality. According to an embodiment, control elements 304-316 of likely-to-be-used functionalities may be provided in a toolbar 302, a status bar, or other user interface menu. The selectable preview element 318,320 may provide a display of the respective control element 304-316 functionality applied to the data element range 104. For example, and as illustrated in FIG. 3, an example selectable preview element 320 is displayed above a chart control element 310. The example selectable preview element 320 includes a preview of a scatter chart representing the data in the data element range 104. According to an embodiment, selectable preview elements 318,320 may be animated, for example, may bounce into the display upon detecting a data element range 104 or upon receiving a selection of a data element range 104.

The data element range 104 may include data elements selected by a user via various methods, or may include a data element range 104 determined to be a data element range of interest. As an example of a data element range 104 determined to be a data element range of interest, if a spreadsheet document contains a single table of data, the table may be determined as a data element range 104 of interest. Alternatively, a data element range 104 may be selected by a user via various methods, for example, a user dragging a mouse cursor over the data he wants to select, a combination of keyboard shortcut keys and dragging a mouse cursor, or as illustrated in FIG. 3, if utilizing a touch interface, a user may tap on a data element and drag to select a range of data elements. In FIG. 3, the example touch interface is shown displayed on a tablet computing device 100. It is to be understood that the touch interface and the tablet computing device 100 are one of various types of interfaces and computing devices with which embodiments may be utilized. The determination of which functionalities may be the likely-to-be-used functionalities for a data element range 104 may be made via various methods, for example, functionalities may be determined based on a type of object in the data element range 104, based on functionalities a user has recently used or typically uses for a specific type of object, based on a configuration selected by a user, etc.

Referring back to FIG. 2, the method 200 proceeds to OPERATION 215 where a selection of a preview element 320 is received. A preview element 320 may be selected via various selection means. For example, a user may use a mechanical input device (e.g., with a mouse, touchscreen, stylus, keyboard keys, etc.) or may use a gesture input made without a mechanical device (e.g., a user body movement) to select a preview element 320.

Figure 4:
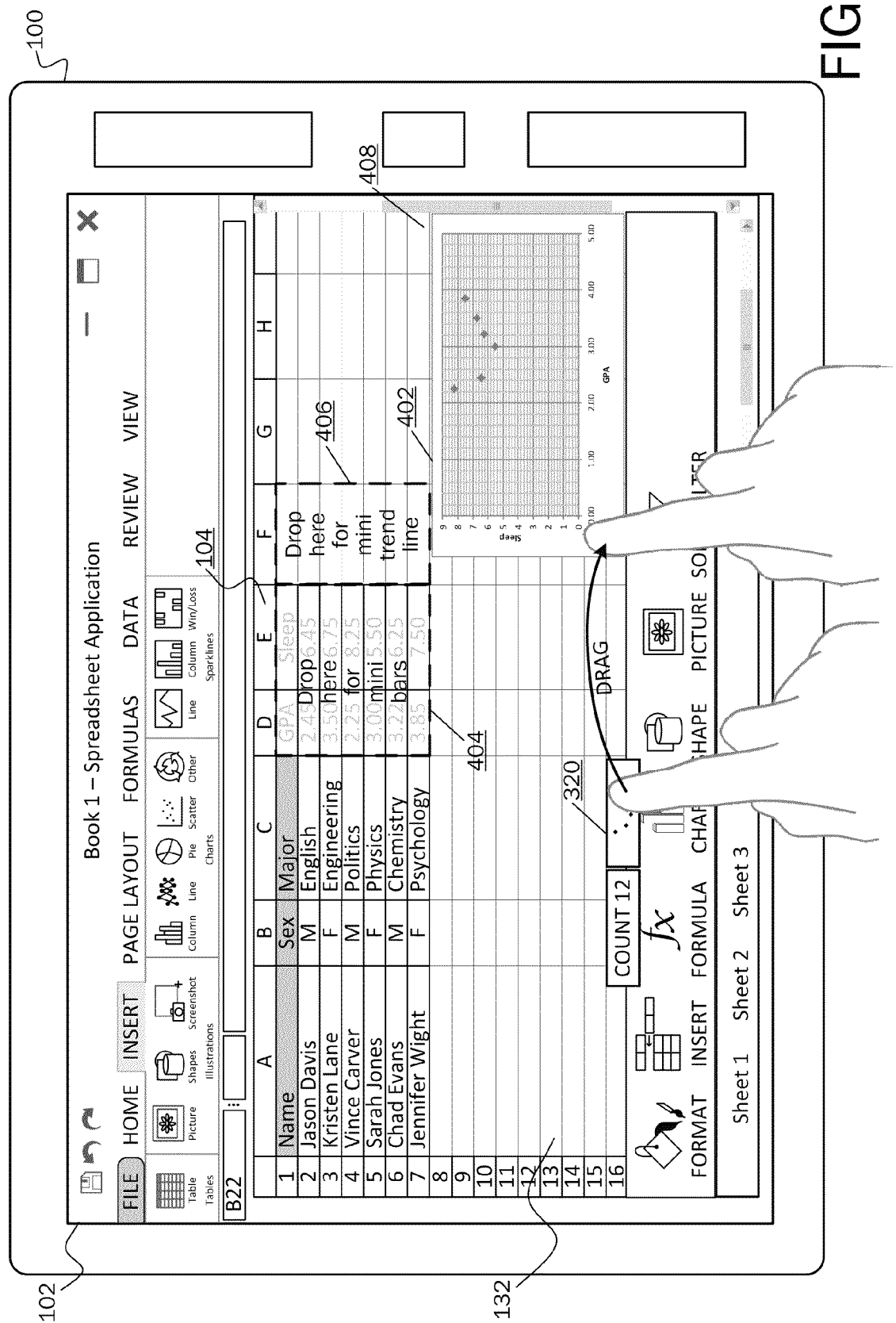
FIG. 4 is an illustration of drop zones displayed in a document and a preview of a functionality applied to a data element range displayed in a drop zone when a selectable preview element is dragged to the drop zone.

Upon receiving a selection of a preview element 320 at OPERATION 215, the method proceeds to OPERATION 220 where one or more drop zones may be provided. With reference to FIG. 4, example drop zones 404, 406, 408 are illustrated. According to embodiments, a drop zone 404, 406, 408 is an area of a document where a selected preview element 320 may be placed. A drop zone 404, 406, 408 may provide an indication of an action that may be applied if the selected preview element 320 is placed in the respective drop zone. For example, as illustrated in FIG. 4, a drop zone 404 may include text such as "drop here for mini bars," wherein if a chart preview element 320 is placed in the drop zone 404, mini bars representing the data element range 104 may be provided. As another example and as also illustrated in FIG. 4, a drop zone 406 may include text such as "drop here for mini trend line," wherein if a chart preview element 320 is placed in the drop zone 406, a mini trend line representing the data element range 104 may be provided. According to embodiments, a drop zone 404, 406, 408 may or may not be identified as a drop zone. For example, an area in a spreadsheet document outside of a table or data element range 104 may be a drop zone but may not be identified as such, such as drop zone 408.

Referring back to FIG. 2, the method 200 proceeds to OPERATION 225 where a movement of the selected preview element 320 to a drop zone 404, 406, 408 is detected. As stated above, a drop zone 404, 406, 408 may include a visual identification that it is a drop zone such as the example mini bars drop zone 404 and mini trend line drop zone 406 illustrated in FIG. 4. Alternatively, a drop zone 404, 406, 408 may not include a visual identification that it is a drop zone. For example, a preview element 320 may be placed in a blank area of a document. The blank area of the document may be a drop zone 408 although not labeled as such. As illustrated in FIG. 4, the example chart preview element 320 is dragged to a drop zone 408, the drop zone in this example being a blank area in the spreadsheet 132.

The method 200 proceeds to OPERATION 230 where a visualization 402 of the functionality associated with the selected preview element 320 and the action associated with the drop zone 404, 406, 408 are applied to the data element range 104 is displayed. According to embodiments, a preview element 320 may animate into a visualization 402. The type of visualization 402 that is displayed may be dependent on the drop zone 404, 406, 408 to which the preview element 320 is dragged. For example and as illustrated in FIG. 4, the chart preview element 320 is dragged to a drop zone 408 and at OPERATION 230, a visualization 402 of a standalone scatter chart is displayed.

Figure 5:
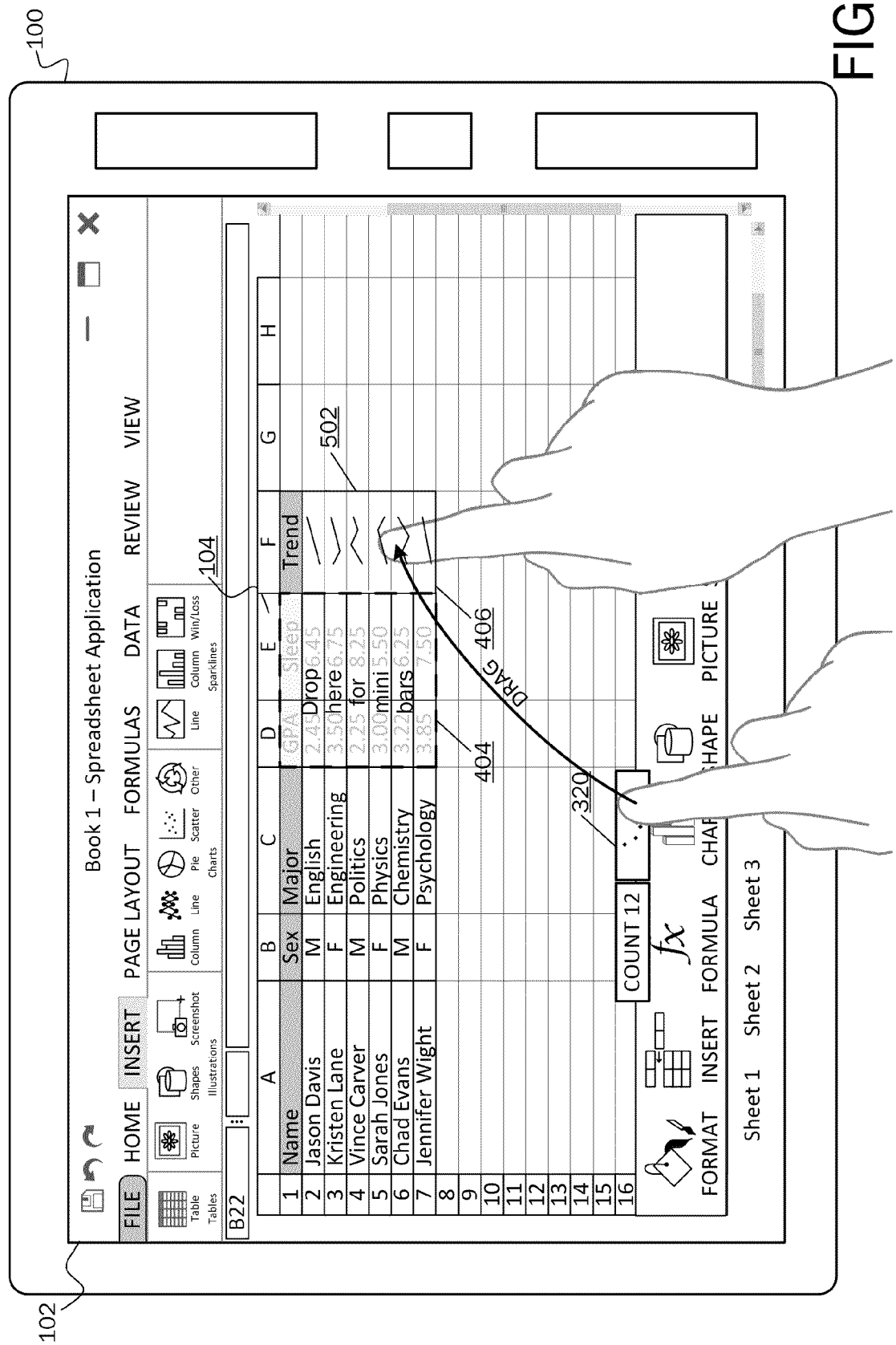
FIG. 5 is an illustration of a preview of a second functionality applied to a data element range displayed in a second drop zone when a selectable preview element is dragged to the second drop zone.
Figure 6:
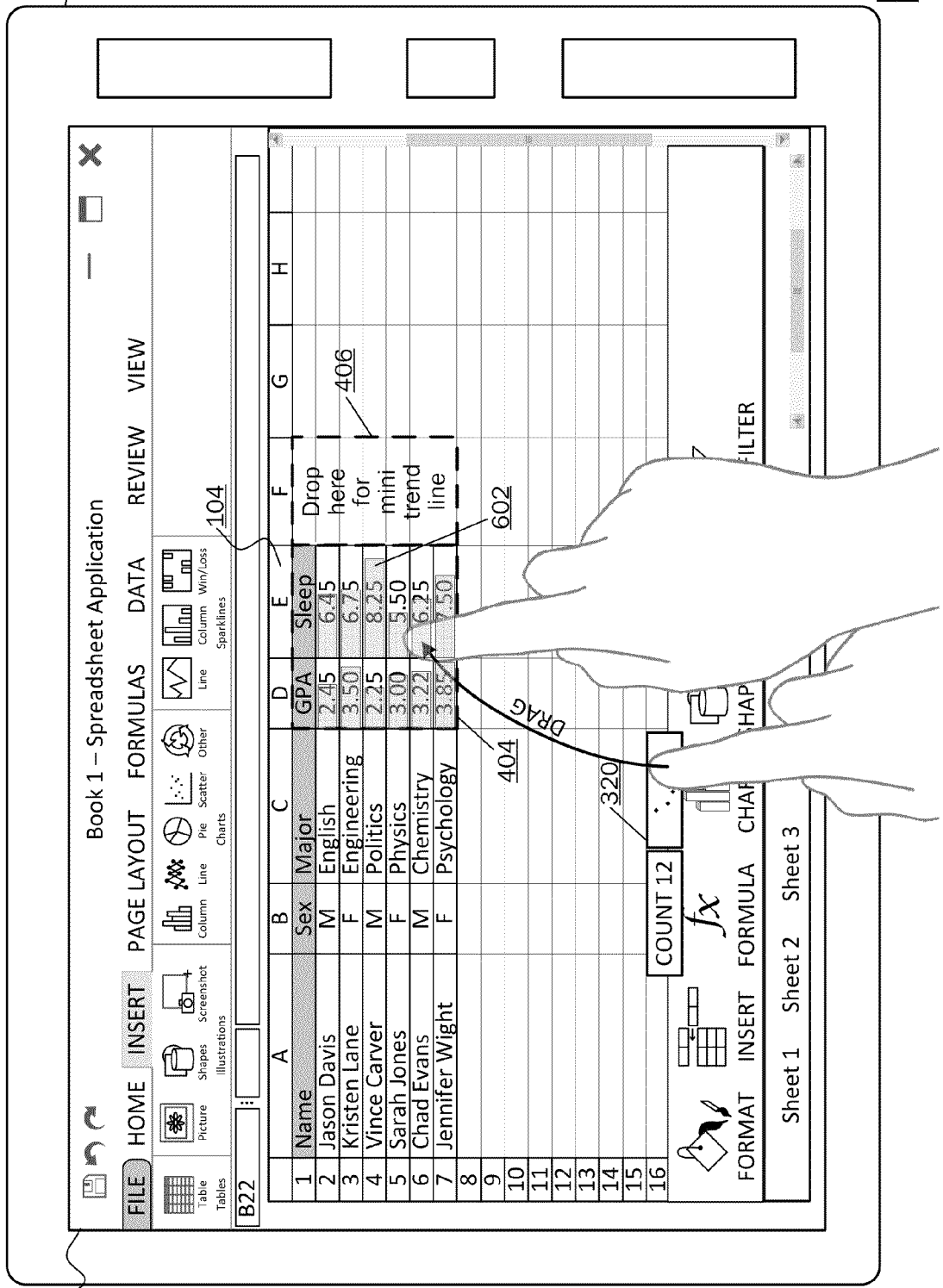
FIG. 6 is an illustration of a preview of a third functionality applied to a data element range displayed in a third drop zone when a selectable preview element is dragged to the third drop zone.

The selected preview element 320 may be dragged to other drop zones 404,406. As another example and as illustrated in FIG. 5, the chart preview element 320 is dragged to a mini trend line drop zone 406. Accordingly, a visualization 502 of mini trend lines representing the data element range 104 is displayed. As another example and as illustrated in FIG. 6, the chart preview element 320 is dragged to a mini bars drop zone 404. Accordingly, a visualization 602 of mini bars representing the data element range 104 is displayed. According to embodiments, visualizations 402, 502, 602 may transition via animation as a user drags a preview element 320 from drop zone to drop zone.

Figure 7:
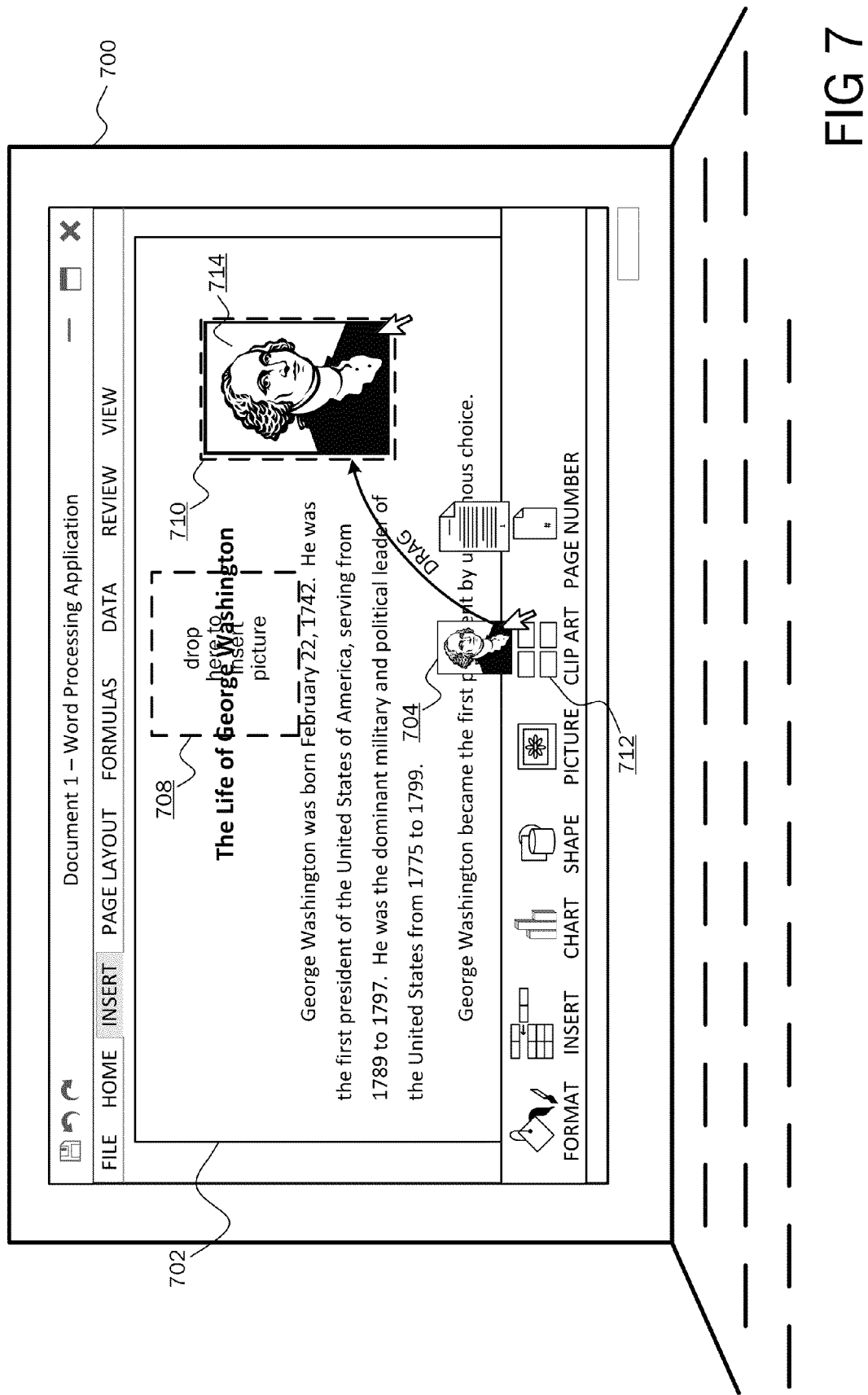
FIG. 7 is an illustration of drop zones displayed in a word processing document and a preview of a functionality displayed in a drop zone when a selectable preview element is dragged to the drop zone.

Although the examples are described above in context of a spreadsheet application, as can be appreciated, embodiments may be utilized in various types of applications 130 including, but not limited to, word processing applications, presentation application, computer aided graphics applications, etc. For example, drop zones for inserting a picture or clip art may be provided in a word processing document. The location of a drop zone may be based on various factors such as an aesthetically pleasing place to insert a picture or clip art. As illustrated in FIG. 7, an example word processing document 714 is being drafted in a word processing application on a laptop computing device 700. A preview element 704 is shown displayed above a clip art control element 712. As illustrated in FIG. 7, the clip art preview element 704 is dragged to a drop zone 710 in the document 702. Accordingly, a visualization 714 of a clip art functionality is displayed in the drop zone 710.

Referring back to FIG. 2, the method 200 proceeds to OPERATION 235 where an indication of a deposit of the preview element 320,704 is received. A preview element 320, 704 may be deposited in a drop zone 404, 406, 408, 710 via various methods. For example, if utilizing a touch screen interface, a user may lift his finger off the touch screen. If a user is using a mouse, a release of a mouse button may deposit the preview element in a drop zone.

Figure 8:
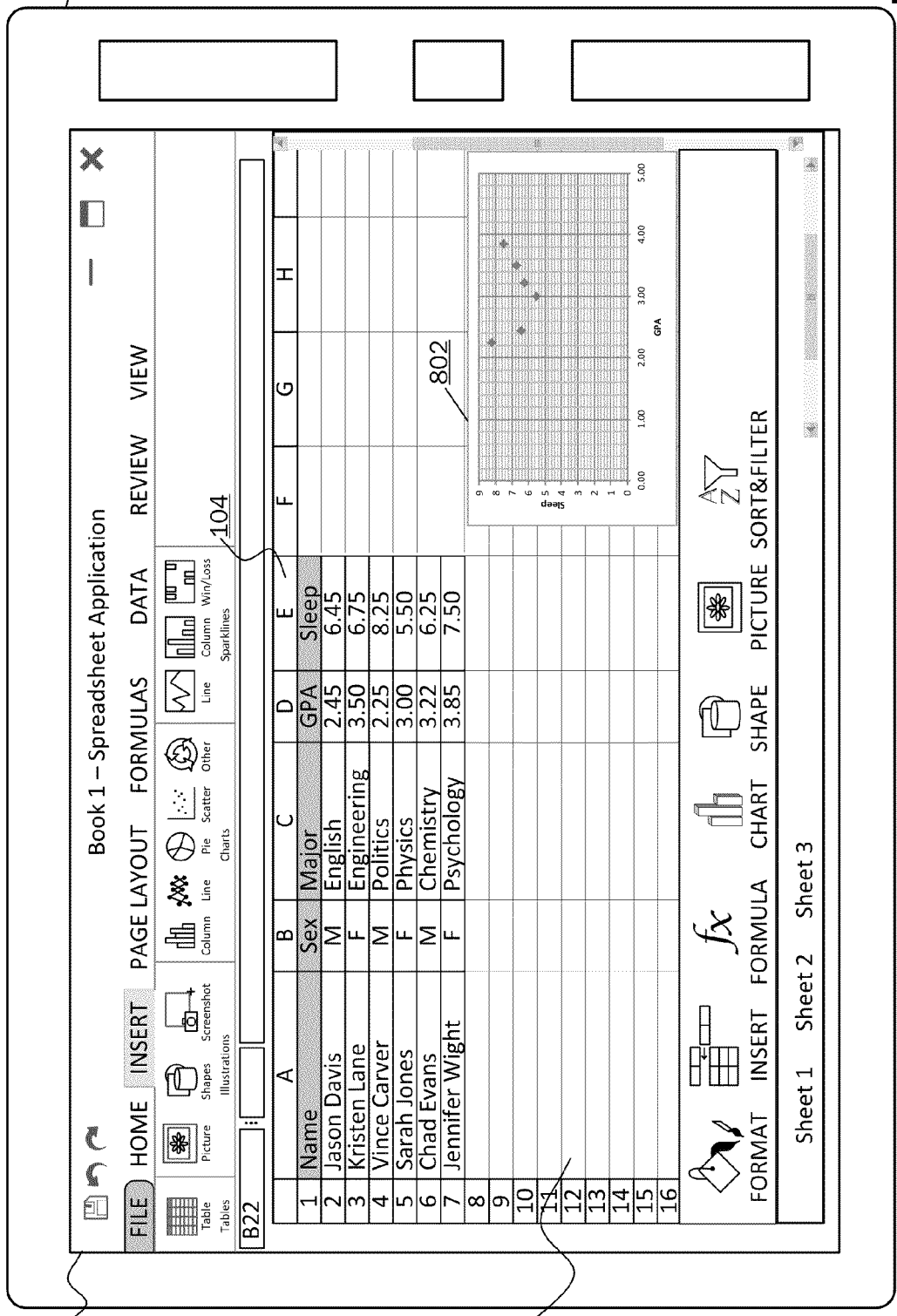
FIG. 8 is an illustration of a scatter chart inserted into a document upon receiving an indication of a deposit of a preview element in a drop zone.

Upon receiving an indication of a deposit of a preview element 320,704 in a drop zone 404, 406, 408, 710 at OPERATION 235, the method 200 proceeds to OPERATION 240, where the action or functionality displayed in the visualization 402, 502, 602, 702 is committed to the document 132,714. FIG. 8 illustrates a scatter chart 802 inserted into the spreadsheet document 132 upon receiving an indication of a deposit of the preview element 320 in the drop zone 408. The method 200 ends at OPERATION 295.

Figure 9:
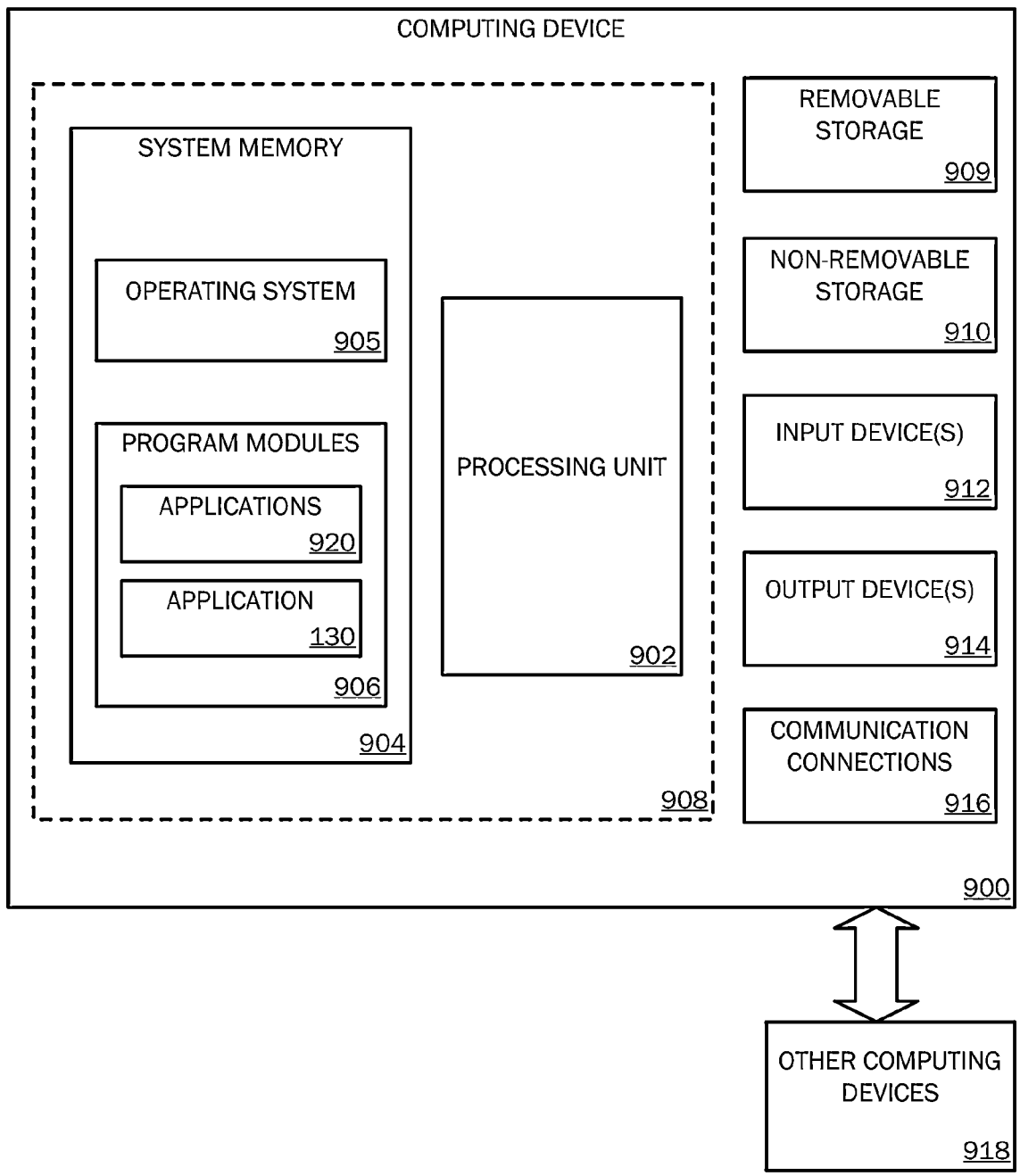
FIG. 9 is a block diagram illustrating example physical components of a computing device with which embodiments of the invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, such as tablet computing device 100, notebook computers, and laptop computers 700), hand-held devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 9 through 11 and the associated descriptions provide a discussion of a variety of operating environments in which embodiments of the invention may be practiced. However, the devices and systems illustrated and discussed with respect to FIGS. 9 through 11 are for purposes of example and illustration and are not limiting of a vast number of computing device configurations that may be utilized for practicing embodiments of the invention, described herein.

FIG. 9 is a block diagram illustrating example physical components (i.e., hardware) of a computing device 900 with which embodiments of the invention may be practiced. The computing device components described below may be suitable for the computing devices described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running software applications 920. The operating system 905, for example, may be suitable for controlling the operation of the computing device 900. Furthermore, embodiments of the invention may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906, such as application 130, may perform processes including, for example, one or more of the stages of the method 200. The aforementioned process is an example, and the processing unit 902 may perform other processes. Other program modules that may be used in accordance with embodiments of the present invention may include electronic mail and contacts applications, word processing applications, database applications, slide presentation applications, drawing or computer-aided application programs, etc. Although many of the examples described herein are described as being performed by a spreadsheet application, embodiments may apply to various types of applications capable of providing an interactive data visualization representing a data element as described herein.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 900 may also have one or more input device(s) 912 such as a keyboard, a mouse, a pen, a sound input device, a touch input device, a gesture recognition device, etc. The output device(s) 914 such as a display, speakers, a printer, etc. may also be included. The aforementioned devices are examples and others may be used. The computing device 900 may include one or more communication connections 916 allowing communications with other computing devices 918. Examples of suitable communication connections 916 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 904, the removable storage device 909, and the non-removable storage device 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 900. Any such computer storage media may be part of the computing device 900.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
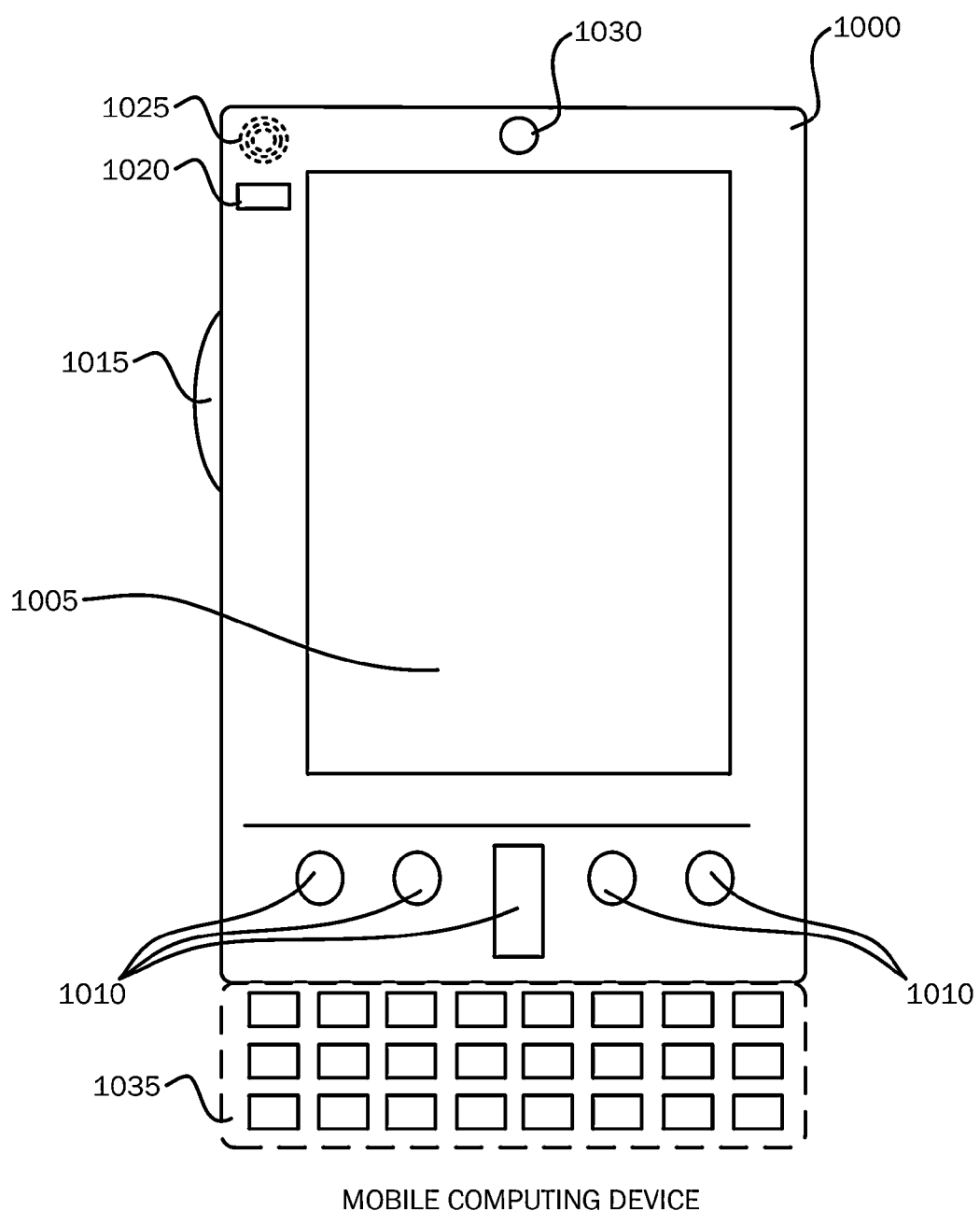
FIGS. 10A and 10B are simplified block diagrams of a mobile computing device with which embodiments of the present invention may be practiced.
Figure 10B:
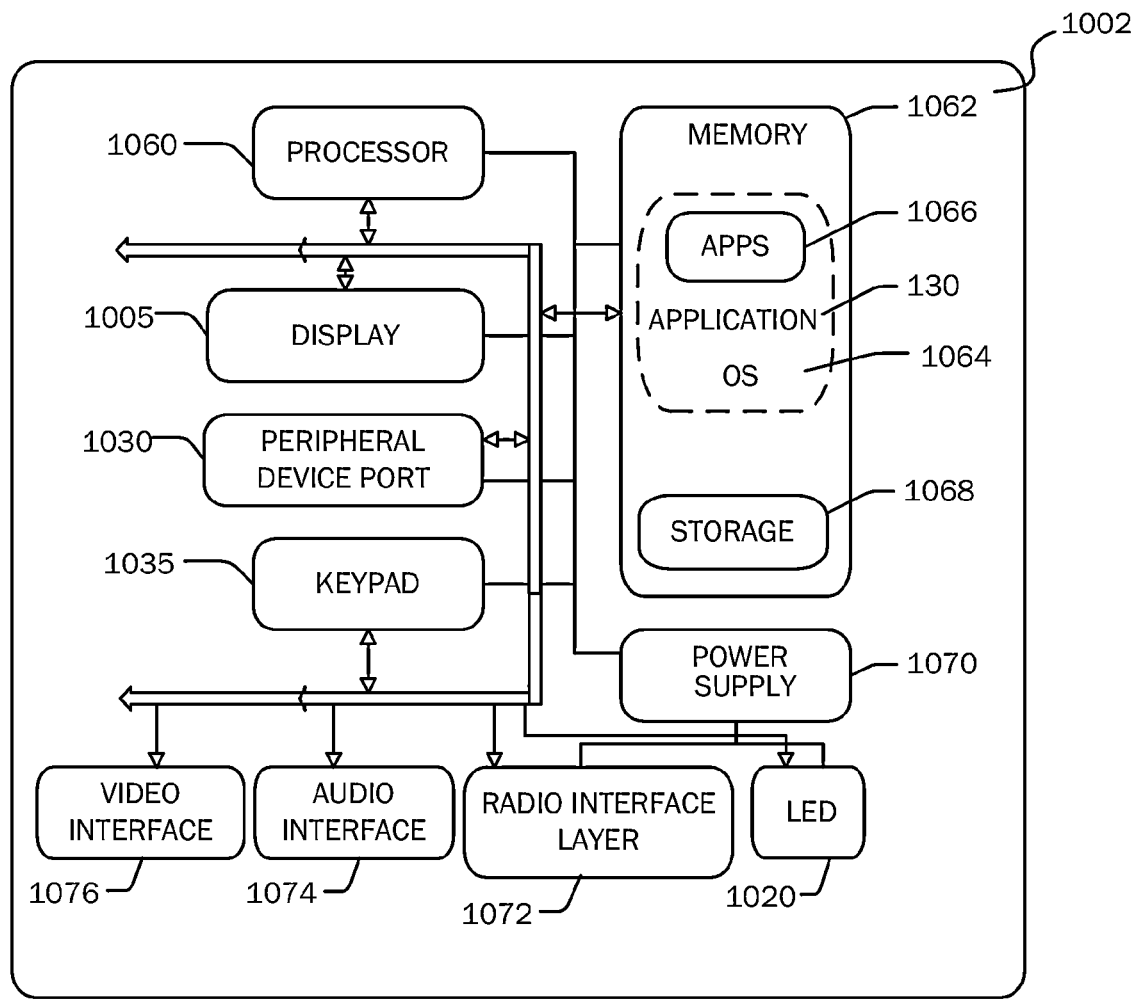
Figure 11:
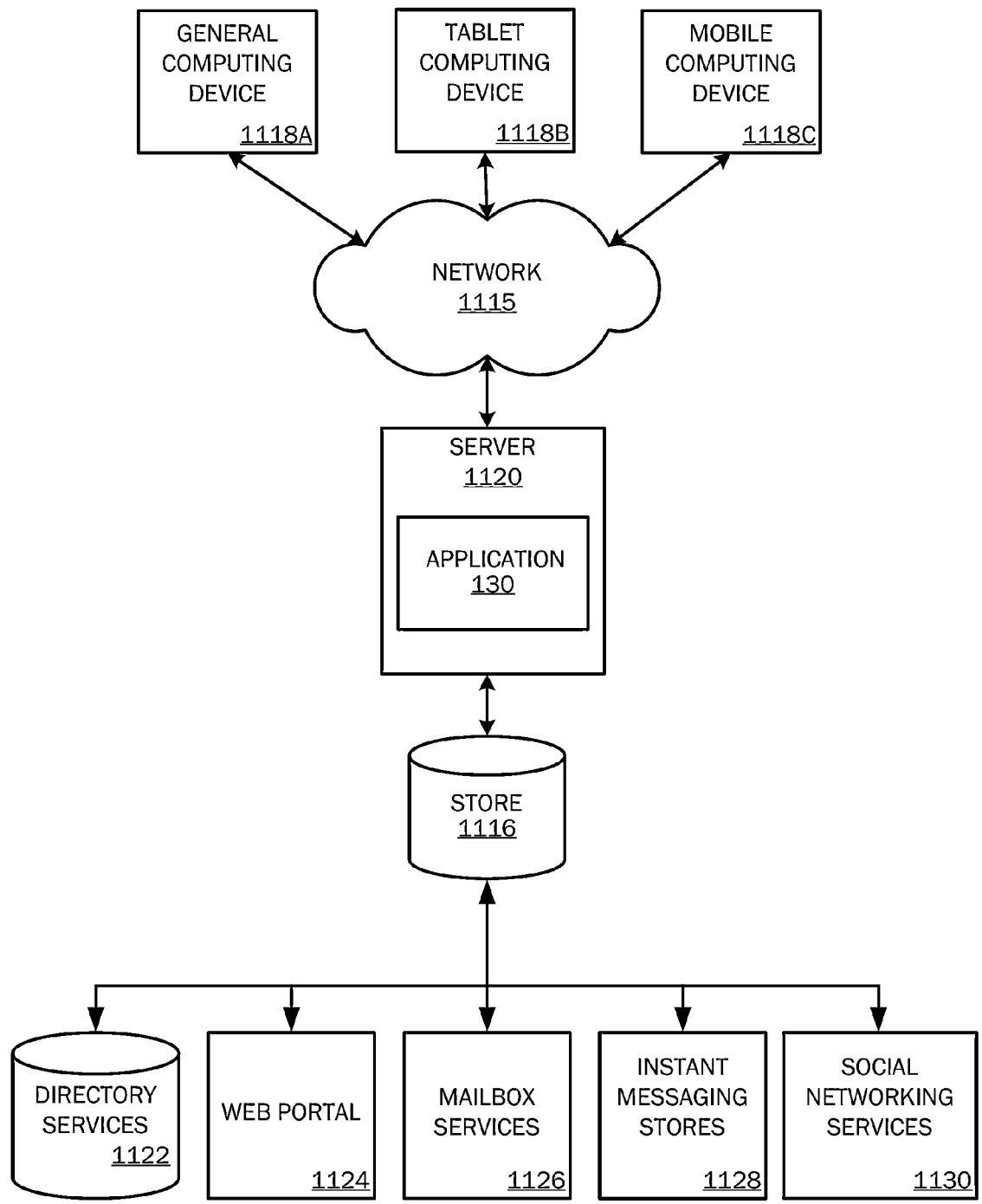
FIG. 11 is a simplified block diagram of a distributed computing system in which embodiments of the present invention may be practiced.

FIGS. 10A and 10B illustrate a mobile computing device 1000, for example, a mobile telephone, a smart phone, a tablet personal computer, such as tablet computing device 100, a laptop computer 700, and the like, with which embodiments of the invention may be practiced. With reference to FIG. 10A, an exemplary mobile computing device 1000 for implementing the embodiments is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative embodiments, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some embodiments, the mobile computing device 1000 incorporates a vibration transducer for providing the user with tactile feedback. In yet another embodiment, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1000 can incorporate a system (i.e., an architecture) 1002 to implement some embodiments. In one embodiment, the system 1002 is implemented as a "smart phone" capable of running one or more applications (e.g., browser, e-mail, calendaring, contact managers, messaging clients, games, and media clients/players). In some embodiments, the system 1002 is integrated as a computing device, such as an integrated personal digital assistant (PDA) and wireless phone.

One or more application programs 1066, which may include application 130, may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000.

The system 1002 has a power supply 1070, which may be implemented as one or more batteries. The power supply 1070 might further include an external power source, such as an AC adapter or a powered docking cradle that supplements or recharges the batteries. The system 1002 may also include a radio 1072 that performs the function of transmitting and receiving radio frequency communications. The radio 1072 facilitates wireless connectivity between the system 1002 and the "outside world", via a communications carrier or service provider. Transmissions to and from the radio 1072 are conducted under control of the operating system 1064. In other words, communications received by the radio 1072 may be disseminated to the application programs 1066 via the operating system 1064, and vice versa.

The radio 1072 allows the system 1002 to communicate with other computing devices, such as over a network. The radio 1072 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1002 provides notifications using the visual indicator 1020 that can be used to provide visual notifications and/or an audio interface 1074 producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present invention, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068. Computer storage media may include volatile and nonvolatile, removable and non-removable media implemented in any method or technology for storage of information, such as computer readable instructions, data structures, program modules, or other data.

Data/information generated or captured by the mobile computing device 1000 and stored via the system 1002 may be stored locally on the mobile computing device 1000, as described above, or the data may be stored on any number of storage media that may be accessed by the device via the radio 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio 1072 or via a distributed computing network. Similarly, such data/information may be readily transferred between computing devices for storage and use according to well-known data/information transfer and storage means, including electronic mail and collaborative data/information sharing systems.

FIG. 11 illustrates one embodiment of the architecture of a system for providing applications to one or more client devices, as described above. Content developed, interacted with or edited in association with the application may be stored in different communication channels or other storage types. For example, various documents may be stored using a directory service 1122, a web portal 1124, a mailbox service 1126, an instant messaging store 1128, or a social networking site 1130. Application 130 may use any of these types of systems or the like for providing an improved interactive user interface for presenting functionalities, the improved user interface incorporating an entry point for functionality commands, as described herein. A server 1120 may provide the application 130 to clients. As one example, the server 1120 may be a web server providing the application over the web. The server 1120 may provide the application 130 over the web to clients through a network 1115. By way of example, the client computing device 1118 may be implemented as the computing device 900 and embodied in a personal computer 1118a, a tablet computing device 1118b,100 and/or a mobile computing device 1118c (e.g., a smart phone). Any of these embodiments of the client computing device 1118 may obtain content from the store 1116. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

We claim:

1. A method for providing an interactive user interface for presenting application functionalities, the method comprising:
   providing a computing device with a display;
   providing a user interface on the display for presenting functionality of an application, the application providing multiple documents on the display for a user to input and manipulate data for performing calculations while the documents are provided on the display;
   displaying selectable preview elements associated with a document of the application, each of the selectable preview elements representing an application functionality of the application;
   selecting a data element range from the document on the display wherein the data element range comprises a group of adjacent cells that have been selected;
   receiving an indication of a selection of a selectable preview element;
   providing one or more drop zones in the document for receiving the selected preview element, wherein a type of visualization that is displayed is dependent on the particular drop zone;
   receiving an indication of a movement of the selected preview element to a drop zone of the document of the application;
   displaying in the drop zone a visualization applied to the selected data element range of the application functionality represented by the selected preview element;
   receiving an indication of a deposit of the selected preview element to the drop zone; and
   in response to dropping the selected preview element into the drop zone, applying to the selected data element range the application functionality represented by the selected preview element of the document of the application.

2. The method of claim 1, further comprising prior to displaying selectable preview elements:
   receiving an indication of a selection of the data element range; and
   determining application functionalities likely to be used for the selected data element range.

3. The method of claim 2, wherein displaying selectable preview elements comprises displaying one or more preview elements representing application functionalities determined likely to be used for the selected data element range.

4. The method of claim 2, wherein providing one or more drop zones in a document for receiving the selected preview element further comprises for each of the one or more drop zones, providing a different specific action to apply in association with applying the application functionality represented by the selected preview element.

5. The method of claim 4, wherein displaying a selectable preview element comprises displaying a preview representation of an application functionality applied to the selected data element range.

6. The method of claim 4, wherein displaying a visualization of the application functionality represented by the selected preview element in the drop zone comprises displaying a representation of the application functionality and a drop zone action applied to the selected data element range.

7. The method of claim 6, further comprising:
   receiving an indication of a movement of the selected preview element to a second drop zone; and
   displaying a visualization of the application functionality represented by the selected preview element in the second drop zone, wherein displaying the visualization comprises displaying a representation of the application functionality and a drop zone action associated with the second drop zone applied to the selected data element range.

8. The method of claim 7, further comprising transitioning visualizations via animation as a preview element is moved to a second drop zone.

9. The method of claim 1, wherein displaying the selectable preview element comprises animating the selectable preview element onto a display.

10. The method of claim 1, wherein providing one or more drop zones in a document for receiving the selected preview element comprises displaying an indication of a drop zone action that will be applied if the selected preview element is placed in the drop zone.

11. A system for providing an intuitive user interface for presenting application functionalities, the method comprising:
    a display;
    an input device; and
    a processor configured to:
    provide a user interface for presenting functionality of an application, the application providing multiple documents on a display for a user to input and manipulate data for performing calculations while the documents are provided on the display;
    display selectable preview elements, each of the selectable preview elements representing an application functionality;
    selecting a data element range from the document on the display wherein the data element range comprises a group of adjacent cells that have been selected;
    receive an indication of a selection of a selectable preview element;
    provide one or more drop zones in the document for receiving the selected preview element;

receive an indication of a movement of the selected preview element to a drop zone of the document of the application;

display in the drop zone a visualization applied to the selected data element range of the application functionality represented by the selected preview element;

receive an indication of a deposit of the selected preview element to the drop zone; and in response to dropping the selected preview element in the drop zone, apply to the selected data element range the application functionality represented by the selected preview element of the documents of the application.

12. The system of claim 11, wherein the processor is further operable to provide a different action associated with each of the one or more drop zones such that when a selected preview element is moved to a drop zone, the action is applied.

13. The system of claim 11, wherein the processor is further operable to provide an indication of the action associated with the drop zone.

14. The system of claim 12, wherein the processor is further operable to provide a visualization incorporating the action associated with a drop zone and the application functionality represented by the selected preview element.

15. The system of claim 14, wherein the processor is further operable to:

receive an indication of a movement of the selected preview element to a second drop zone; and provide a visualization incorporating the action associated with the second drop zone and the application functionality represented by the selected preview element.

16. The system of claim 15, wherein the processor is further operable to provide an animated transition between the visualization provided in the first drop zone to the visualization provided in the second drop zone.

17. The system of claim 11, wherein the processor further operable to:

receive an indication of a selection of a data element range;

determine application functionalities likely to be used for the selected data element range; and display one or more preview elements representing the application functionalities likely to be used for the selected data element range.

18. A computer-readable storage device not including a propagated signal and tangibly embodying computer-executable instructions for presenting application functionalities, the method comprising:

providing a user interface on a display with a processor for presenting functionality of an application, the application providing multiple documents on the display for a user to input and manipulate data for performing calculations while the documents are provided on the display;

selecting a data element range from a document on the display wherein the data element range comprises a group of adjacent cells that have been selected;

determining application functionalities likely to be used for the selected data element range;

displaying selectable preview elements, each of the preview elements representing an application functionality determined likely to be used for the selected data element range;

receiving an indication of a selection of a selectable preview element;

providing one or more drop zones in the document for receiving the selected preview element;

providing an action associated with each of the one or more drop zones of the documents of the application;

receiving an indication of a movement of the selected preview element to a drop zone;

displaying a visualization in the drop zone, the visualization incorporating the action associated with the drop zone and the application functionality represented by the selected preview element applied to the selected data element range;

receiving an indication of a deposit of the selected preview element to the drop zone; and in response to dropping the selected preview element into the drop zone, applying to the selected date element range the application functionality represented by the selected preview element.

19. The computer-readable storage device of claim 18, further comprising:

receiving an indication of a movement of the selected preview element to a second drop zone; and displaying a visualization incorporating the action associated with the second drop zone and the application functionality represented by the selected preview element.

20. The computer-readable storage device of claim 18, wherein displaying a visualization includes animating a morphing of the selected preview element into the visualization.

21. The method of claim 1, wherein providing one or more drop zone comprises providing two drop zones and wherein the visualization that is displayed as a result of moving the selected preview element to one of the drop zones is different than another visualization that is displayed as a result of moving the selected preview element to the other drop zone.

* * * * *